United States Patent

[11] 3,620,638

| [72] | Inventors | J. Arthur Kaye<br>Fort Lee;<br>Morgan E. Lentz, Rutherford, both of N.J. |
|---|---|---|
| [21] | Appl. No. | 66,166 |
| [22] | Filed | Aug. 24, 1970 |
| [45] | Patented | Nov. 16, 1971 |
| [73] | Assignee | J. Arthur Kaye<br>Fort Lee, N.J. |

[54] LIQUID PROPULSION DEVICE
16 Claims, 6 Drawing Figs.

| [52] | U.S. Cl. | 415/106, 415/170, 415/213 |
|---|---|---|
| [51] | Int. Cl. | F01d 3/00 |
| [50] | Field of Search | 415/172, 213, 104–106, 215 |

[56] References Cited
UNITED STATES PATENTS

| 86,264 | 1/1869 | Henson | 415/215 |
|---|---|---|---|
| 464,898 | 12/1891 | Rooke | 415/215 |
| 398,301 | 2/1889 | Willson | 415/215 |
| 1,401,193 | 12/1921 | Schetzel | 415/172 |

*Primary Examiner*—C. J. Husar
*Attorney*—Kenyon & Kenyon, Reilly Carr & Chapin

ABSTRACT: A propulsion mechanism, such as a pump, for propelling liquids first radially and then axially through the mechanism at high pressure, the mechanism having within a cylindrical housing a rotor balanced to minimize radial and axial forces on the rotor whereby bearings are not required for the rotor.

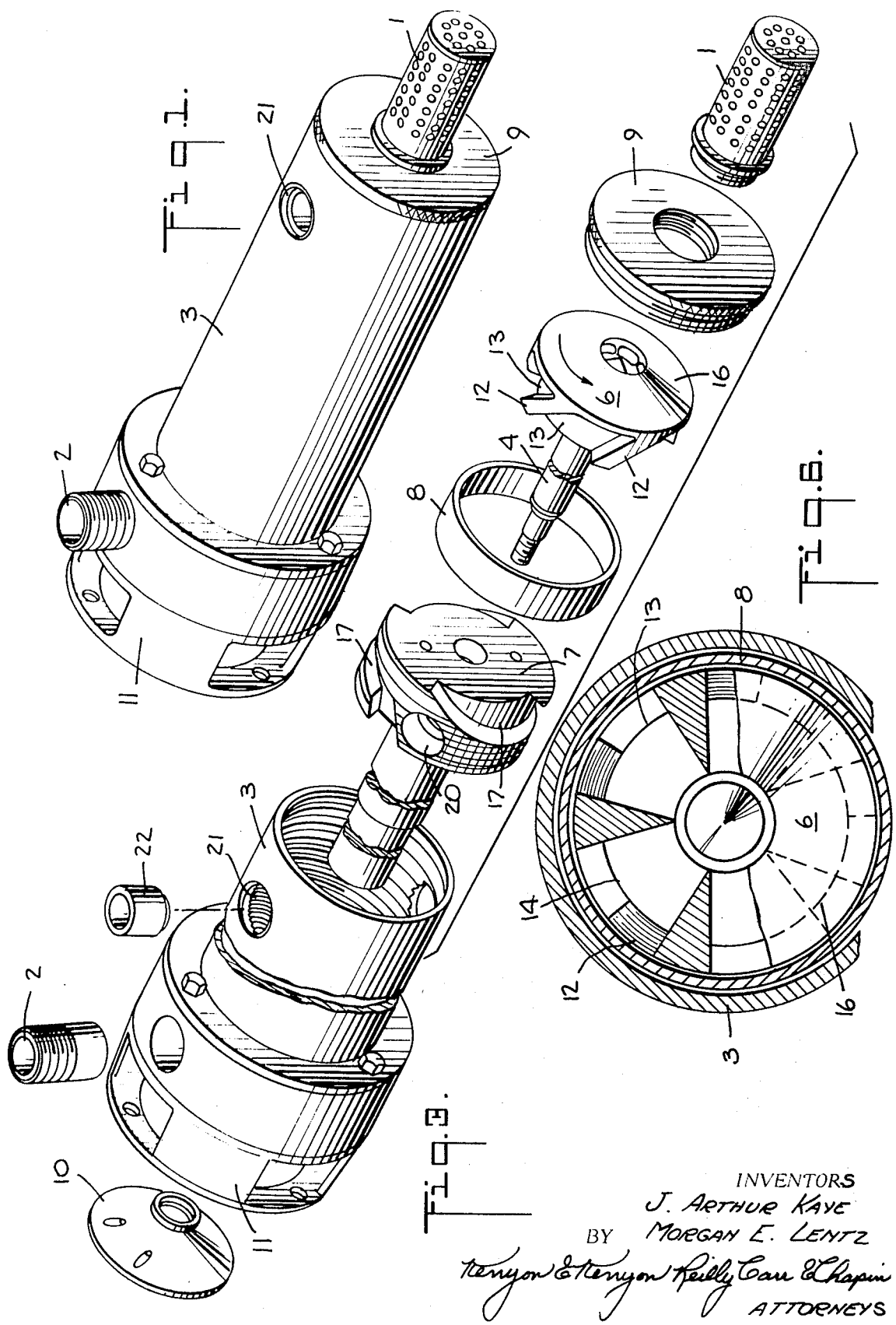

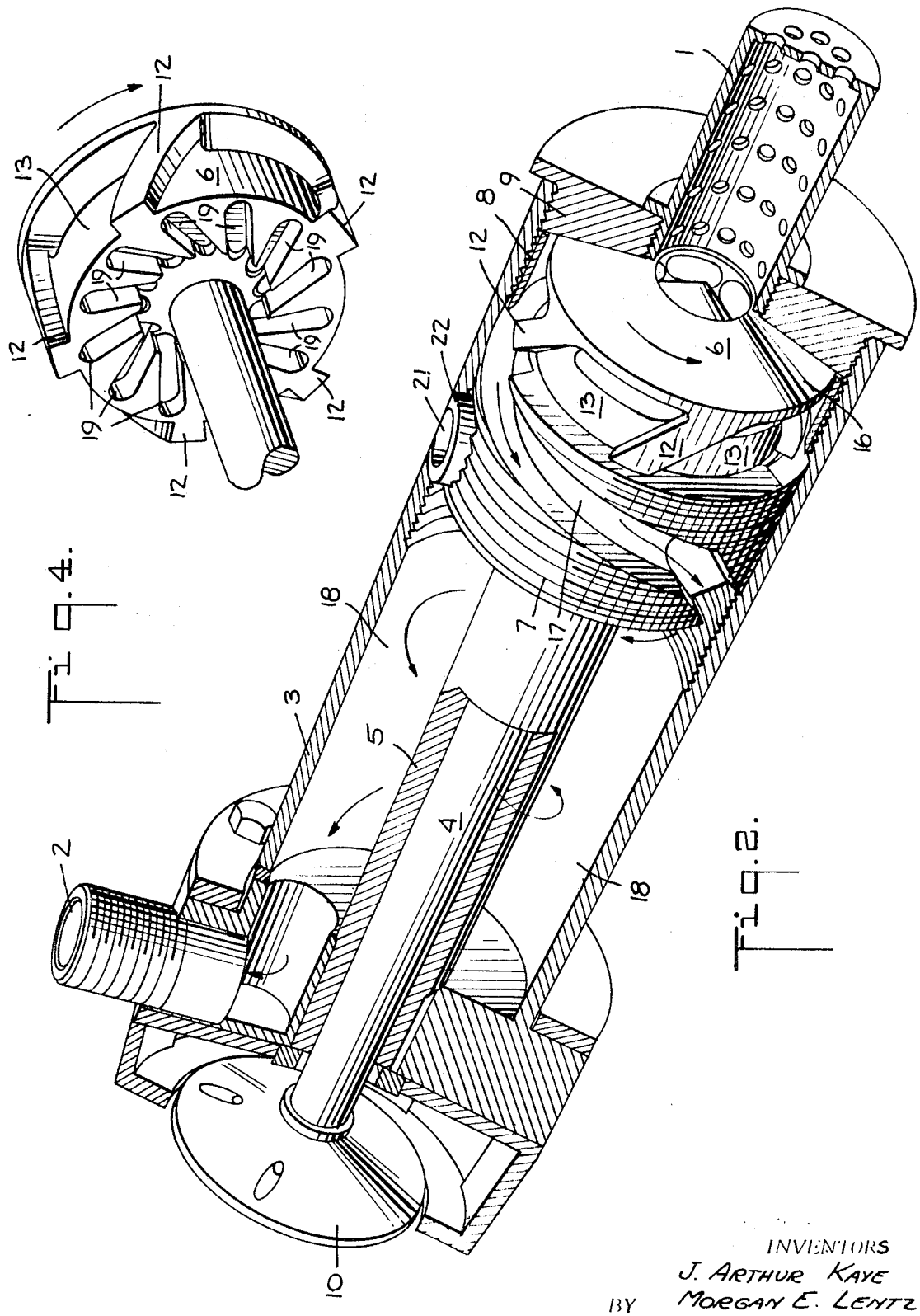

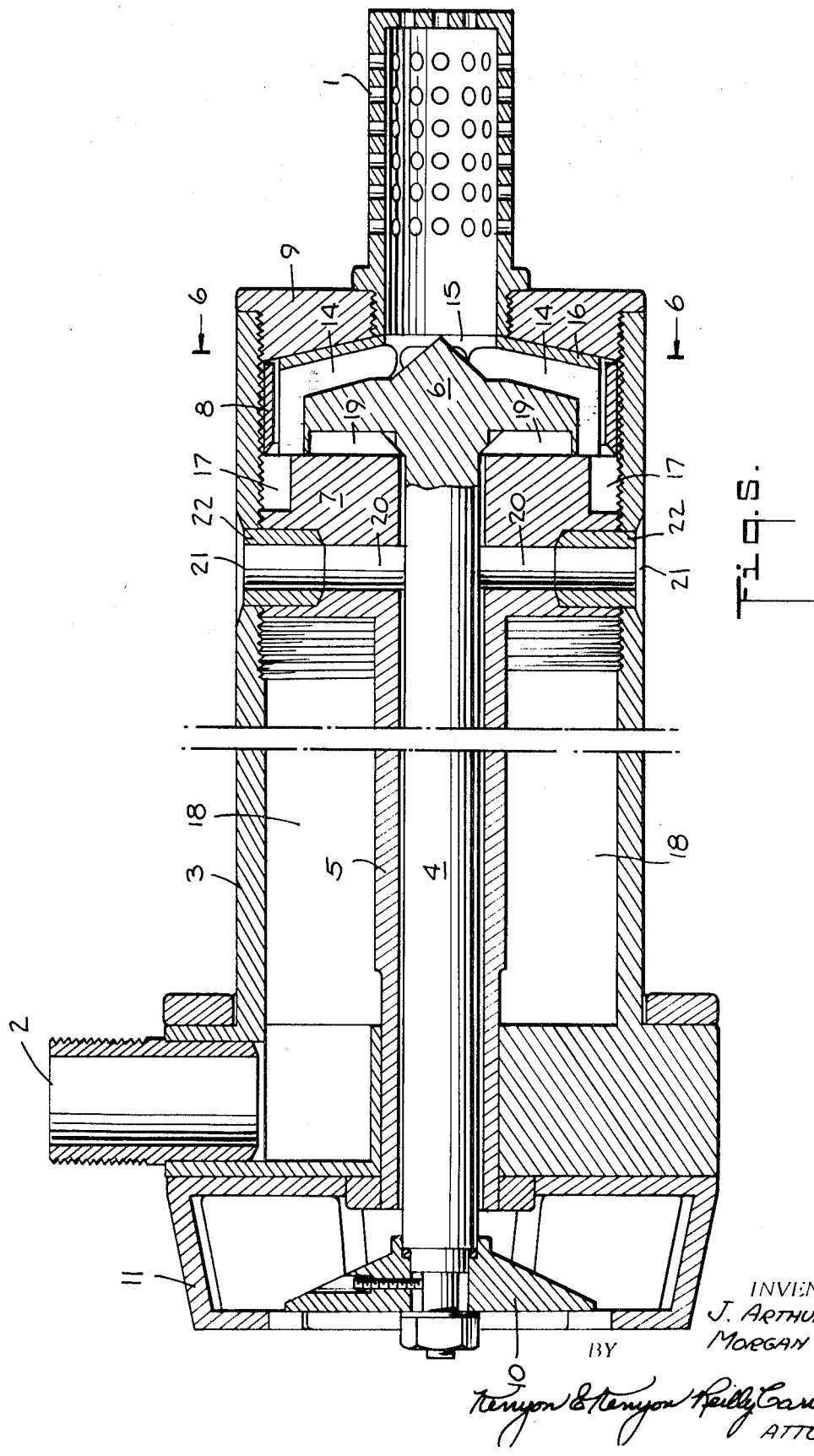

LIQUID PROPULSION DEVICE

BACKGROUND OF THE INVENTION

While useful for other purposes, this invention is particularly useful for pumping liquids, There is a need in the pump art for inexpensive pumps, i.e. pumps which can be made at low cost because they eliminate conventional high-cost bearings and high-strength materials necessitated by unbalance forces. This need is particularly pressing in the art of pumps for corrosive liquids where such liquids quickly corrode such bearings and in fact any metal parts, resulting in the necessity of frequent repair, replacement, and prolonged periods of shutdown of industrial operations.

SUMMARY OF THE INVENTION

This invention provides a construction for an inexpensive liquid propulsion device, such as a pump, which by minimizing radial and axial forces which might unbalance the rotor and by using the liquid as a bearing opens the way to the elimination of conventional bearings and the use of low-strength construction materials such as plastic materials which can be easily selected to be resistant to corrosion by liquids which quickly destroy conventional metallic materials. Essentially the radial forces are minimized and the liquid used as a bearing by use of a combined impeller and propeller which first impels the liquid radially and then propels it axially so that a peripheral liquid bearing is formed to cushion radial forces. Then by pocketing liquid on the downstream side of the impeller-propeller a low-pressure zone is created on the downstream side of the impeller-propeller to minimize axial forces and produce other beneficial results such as creating an axial liquid bearing and preventing liquid flow downstream along the rotor shaft.

BRIEF DESCRIPTION OF THE DRAWINGS

FIG. 1 is a perspective view of a liquid pump;
FIG. 2 is a view of FIG. 1 with the outer housing partially removed to afford a view of internal parts and the liquid flow path;
FIG. 3 is an exploded view of FIGS. 1 and 2;
FIG. 4 is a view of the downstream side of the impeller-propeller;
FIG. 5 is a cross section of FIG. 1;
FIG. 6 is a view along 6—6 of FIG. 5.

PREFERRED EMBODIMENT OF THE INVENTION

At least the right half (FIG. 1) of the pump will be submerged in liquid to be pumped. It has an intake end surrounded by a sievelike filter 1, an outflow outlet 2, a plastic outer housing 3, and a rotor shaft 4 driven from the left-hand end by a suitable motor (not shown). Rotor shaft 4 rotates in a plastic cylinder 5. In fact all parts may be formed of corrosive resistant plastic, that is to say, resistant to corrosive liquid which the pump is designed to pump.

On the right-hand end of rotor shaft 4 is an impeller-propeller 6 (FIG. 4). Rotor shaft 4 extends through a member 7 which for strength is threaded into housing 3 and spaced from end closure 9 by collar 8. End closure 9 is also threaded into housing 3 as shown. A guard 10 is secured to the left-hand end of rotor shaft 4 within frame 11. Cylinder 5 is supported in frame 11 and member 7.

Impeller-propeller 6, which rotates in the direction shown in FIGS. 2, 3 and 4, is provided on the upstream side (to the right in the FIGS. 1, 2, 3 and 5) with spaced peripheral vanes 12 separated by indentations 13 which communicate with filter 1 by way of channels 14 and inlet hole 15 in a shield 16 over the upstream face of impeller-propeller 6. Vanes 12 are shaped so that during rotation of impeller-propeller 6, liquid is first driven radially and then axially downstream. In this action, the liquid first forms a liquid body between the impeller-propeller 6 and the housing 3 or collar 8, this body acting as a liquid bearing peripherally of the impeller-propeller 6 between it and collar 8. Then the liquid flows through spiral channels 17 in member 7 into the annular chamber 18 between housing 3 and cylinder 5 in a whirling helical pattern indicated by arrows in FIG. 2 and then to outlet 2. There are two spiral channels 17 diametrically opposite each other for balance but more channels 17 appropriately positioned for balance may be desirable.

As best seen in FIGS. 4 and 5, the downstream side of impeller-propeller 6 has a number of pockets or indentations 19, the purpose of which will be explained below.

Member 7 has two diametrically opposite channels 20 which, when member 7 is screwed into the position shown in FIGS. 2 and 5, align with diametrically opposite inlets 21 for the pumped liquid. Collars 22 lock member 7 in position. Channels 20 feed liquid to the annular space between rotor shaft 4 and cylinder 5 and member 7, from which space the liquid may pass to indentations 19.

The purpose of channels 20, inlets 21 and indentations 19 is to create a liquid buffer action between member 7 and the downstream side of impeller-propeller 6, which buffer action may have several useful effects. It will be understood that a quantity of the liquid being pumped will enter inlets 21, channels 20 and through the annular space between rotor 4 and member 7 to fill indentations 19. Rotation of impeller-propeller 6, and with it the body of liquid in the indentations 19, will then establish a whirling body of liquid between member 7 and downstream side of impeller-propeller 6. This whirling body will act as a fluid bearing or buffer between member 7 and impeller-propeller 6. Moreover, because the liquid is moving, a pressure decrease will occur which decrease will have two effects. First, it will tend to prevent liquid from flowing to the left in the annular space between rotor 4 and cylinder 5, and thereby prevent liquid seepage to the driving motor. Second, it will tend to counteract rightward directed reaction forces of the pumped liquid on the impeller-propeller 6 so that the net axial forces on the impeller-propeller 6 are minimized.

It will be seen that the foregoing construction provides both the high-pressure advantages of radial pumps and the minimized radial dimensions of low-pressure axial flow pumps. Pressure is built up radially by the centrifugal action of vanes 12 and then changed to the axial direction. The angle of vanes 12 with respect to the axis may be varied to produce optimum results depending on the viscosity and specific gravity of the liquid being pumped, and on the rotary speed of the impeller-propeller 6.

What is claimed is:

1. A propulsion mechanism for propelling liquid radially and then axially through the mechanism having a rotor balanced within the liquid to minimize radial forces on the rotor whereby mechanical bearings are not required comprising:
   a cylindrical housing;
   a rotor axially positioned within the housing and having an impeller-propeller for the liquid;
   and surfaces on the impeller-propeller for impelling the liquid first centrifugally to form a hydrodynamic bearing between the impeller-propeller and the housing and then axially of the housing.

2. A mechanism as in claim 1 including:
   a member in the housing and around the rotor and on the downstream side of the impeller-propeller having helical grooves on its periphery for receiving liquid from the impeller-propeller and imparting a helical motion to the liquid between the housing and rotor downstream of the member.

3. A propulsion mechanism for propelling liquid radially and then axially through the mechanism having a rotor balanced within the liquid to minimize radial and axial forces on the rotor whereby mechanical bearings are not required comprising:
   a cylindrical housing;
   a rotor axially positioned within the housing and having an impeller-propeller for the liquid;

surfaces on the impeller-propeller for impelling the liquid first centrifugally to form a hydrodynamic bearing between the impeller and the housing and then axially of the housing;

and means for forming a liquid buffer action on the downstream side of the impeller-propeller.

4. A mechanism as in claim 3 in which the latter means comprises:
means on the impeller-propeller for whirling liquid on the downstream side of the impeller-propeller.

5. A mechanism as in claim 4 including:
means for supplying liquid from the exterior of the mechanism to the downstream side of the impeller-propeller.

6. A mechanism as in claim 4 in which the latter means comprises:
liquid-retention means on the downstream side of the impeller-propeller for whirling liquid on the downstream side of the impeller-propeller.

7. A mechanism as in claim 6 including:
means for supplying liquid from the exterior of the mechanism to the liquid-retention means.

8. A mechanism as in claim 3 in which the latter means comprises:
means on the impeller-propeller for whirling liquid on the downstream side of the impeller-propeller to form a hydrodynamic bearing on the downstream side of the impeller-propeller.

9. A mechanism as in claim 3 in which the latter means comprises:
means for reducing liquid pressure on the downstream side of the impeller-propeller.

10. A propulsion mechanism for propelling liquid axially through the mechanism having a rotor balanced within the liquid to minimize radial and axial forces on the rotor whereby mechanical bearings are not required comprising:
a cylindrical housing;
a rotor axially positioned within the housing and having an impeller-propeller for the liquid;
a member in the housing and around the rotor and on the downstream side of the impeller-propeller having diametrically opposite helical grooves on its periphery for receiving liquid from the impeller-propeller and imparting a helical motion to the liquid between the housing and rotor downstream of the member;

surfaces on the impeller-propeller for impelling the liquid first centrifugally to form a hydrodynamic bearing between the impeller-propeller and the housing and then axially of the housing;

and means for forming a liquid buffer action on the downstream side of the impeller-propeller.

11. A mechanism as in claim 10 in which the latter means comprises:
means on the impeller-propeller for whirling liquid on the downstream side of the impeller-propeller.

12. A mechanism as in claim 11 including:
means for supplying liquid from the exterior of the mechanism to the downstream side of the impeller-propeller.

13. A mechanism as in claim 11 in which the latter means comprises:
liquid-retention means on the downstream side of the impeller-propeller for whirling liquid on the downstream side of the impeller-propeller.

14. A mechanism as in claim 13 including:
means for supplying liquid from the exterior of the mechanism to the liquid-retention means.

15. A mechanism as in claim 10 in which the latter means comprises:
means on the impeller-propeller for whirling liquid on the downstream side of the impeller-propeller to form a hydrodynamic bearing on the downstream side of the impeller-propeller.

16. A mechanism as in claim 10 in which:
the rotor shaft is surrounded by a cylinder to separate the rotor shaft from the liquid;
and the latter means comprises means for reducing liquid pressure on the downstream side of the impeller-propeller to counteract reaction forces on the impeller-propeller and prevent flow of liquid downstream between the rotor and cylinder.

* * * * *